May 23, 1933.   P. A. HERNANDEZ   1,910,248
SIGNALING DEVICE
Filed June 8, 1932   2 Sheets-Sheet 1
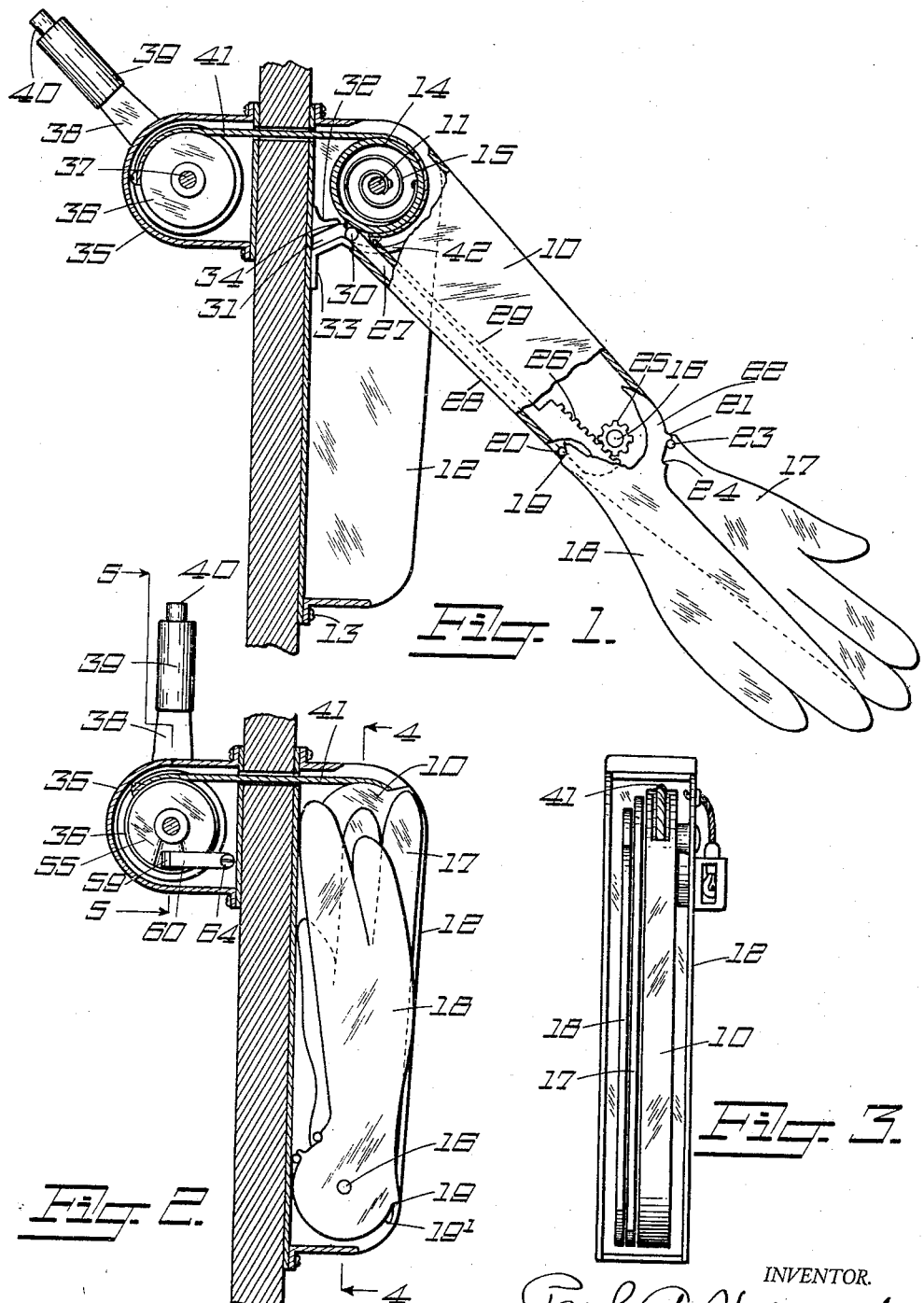

May 23, 1933.    P. A. HERNANDEZ    1,910,248
SIGNALING DEVICE
Filed June 8, 1932    2 Sheets-Sheet 2
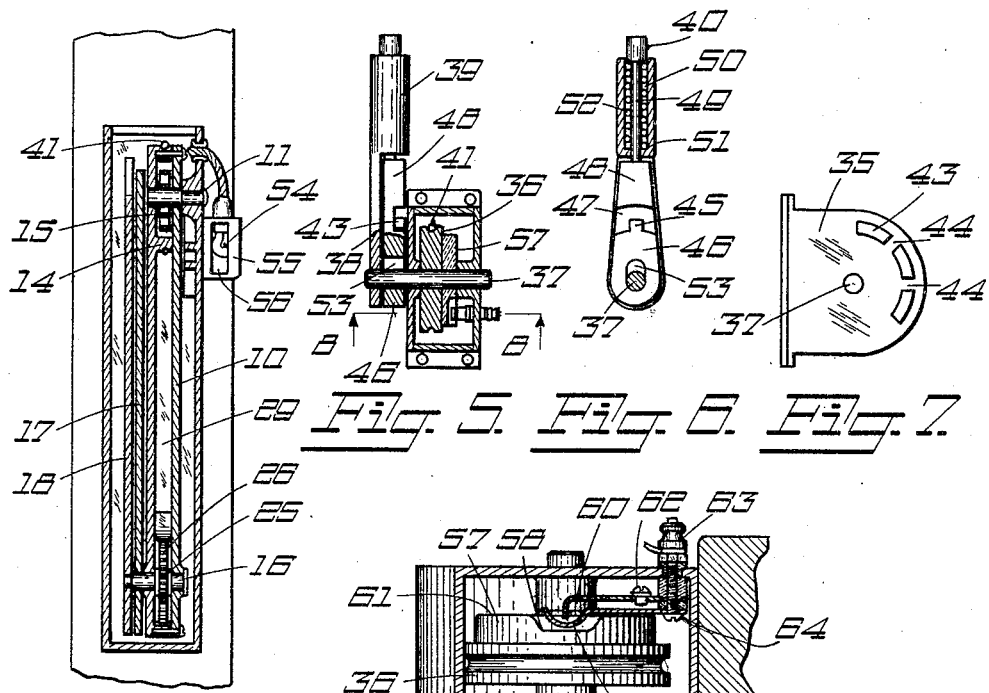
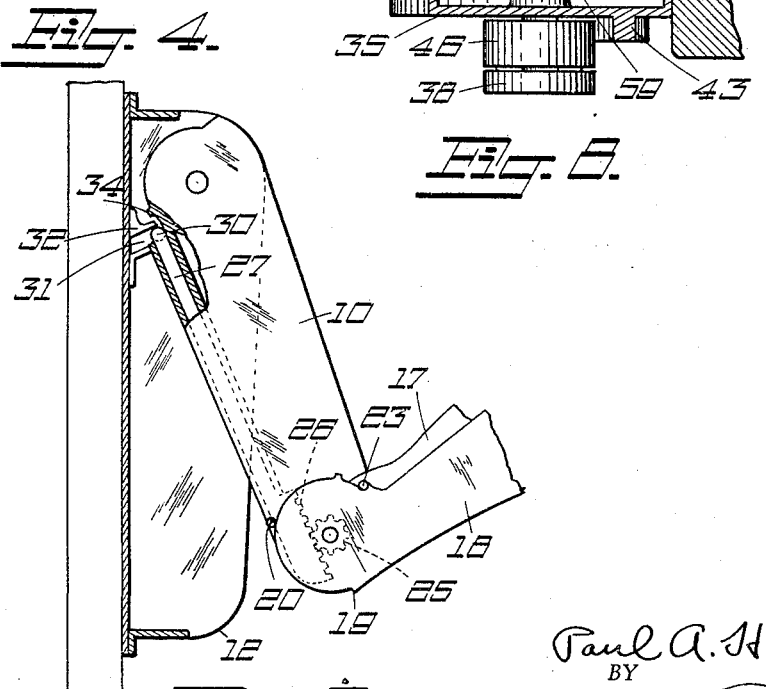
INVENTOR.
Paul A. Hernandez
BY
Harry C. Schroeder
ATTORNEYS.

Patented May 23, 1933

1,910,248

UNITED STATES PATENT OFFICE

PAUL A. HERNANDEZ, OF OAKLAND, CALIFORNIA

SIGNALING DEVICE

Application filed June 8, 1932. Serial No. 616,017.

This invention is a signaling device which is especially adapted for use in connection with automotive vehicles and which, due to its compact structure and collapsible features, is ideally adapted for passenger car use as, due to these features, the device when in non-signaling position, projects a minimum distance from the side of the car on which it is mounted.

The usual signaling device, especially those which incorporate a signal arm, usually are too small when in signaling position to be practical, or, the housing in which the arm is concealed when in non-signaling position is abnormally large and projects over too great an area.

It is for these reasons that this invention was evolved and in which case the signaling arm is made collapsible or foldable so as to require a minimum of space when in non-signaling position.

The main object of the invention is to provide a foldable or collapsible signaling arm for direction signals which will require a minimum of space when in non-signaling position, and yet when in extended or signaling position, will be of sufficient area to provide a conspicuous and practical signal.

Another object of the invention is to provide a signaling arm as outlined which will automatically fold or collapse when brought to non-signaling position and which will automatically open and become fully extended when moved from the non-signaling to signaling position.

A further object of the invention is to provide a signaling element as outlined with means for controlling the signaling arm and locking the signal arm in various signaling positions.

Other objects and advantages of the invention will become apparent as the following description is read on the drawings forming a part of this specification and in which similar reference characters are used to designate similar parts throughout the several views, of which:

Fig. 1 is a front elevation of the invention in signaling position showing various parts in section to clearly indicate various connections and operating means.

Fig. 2 is a front elevation of the invention showing the signaling arm in folded position within the case or housing, the housing for the arm and the housing for the operating or controlling means being indicated in section.

Fig. 3 is a side elevation of Fig. 2.

Fig. 4 is a section taken on line 4—4 of Fig. 2.

Fig. 5 is a section taken on line 5—5 of Fig. 2.

Fig. 6 is a view of the control and locking lever, showing the handle in section for indicating the spring urged plunger.

Fig. 7 is an outside view of the control housing.

Fig. 8 is a section taken on line 8—8 of Fig. 5 and showing the sheave in full.

Fig. 9 is a fragmentary view showing the signal arm in partly folded position as is assumed when the arm is intermediate non-signaling and signaling position.

The invention consists of an arm 10 which is pivoted at 11 within a housing 12, which housing is provided with means 13 whereby it is secured to the side of an automotive vehicle, the housing 12 being only of sufficient length to receive the arm 10 therein, and being of sufficient width to fully conceal the arm, the side of the housing being open to permit entrance and exit of the arm.

The arm 10 preferably is made hollow, and has a spring drum 14 formed between the front and back walls of the arm 10 in which the volute spring 15 is mounted, one end of the spring being secured to the interior of the drum and the other end of the spring being secured to the shaft 11 which is non-rotatably fixed in the housing 12.

Pivotally mounted on the other end of the arm as indicated at 16, are two cooperative hand elements 17 and 18 which are adapted to fold together so as to require a minimum space equal to the width of the arm when folded, and which when extended as shown in Fig. 1, form a complete hand. These members 17 and 18 are provided with projections 19 and $19^1$ which are in alignment when the hand is opened, and which are adapted to cooperate with a stop 20, which may consist of a pin or may be the terminal of the inside wall of the arm. A lug 21 is made integral with the forward edge of the hub 22 of hand portion 18, and a stop member such as a pin 23 is fixedly secured in the hand portion 17, the hand portion 18 being relieved as at 24 to permit hand portion 18 to fold over onto hand portion 17.

The operating means for closing the hand and folding the hand back on to the arm consists of a pinion 25 which is fixedly secured to the hand portion 18, and which cooperates with a rack 26 having an extension 27 which is slidable between the inside wall 28 and a ledge 29 fixed to the interior of the arm, providing a slideway for the member 27. A pin 30 is secured at the upper end of the extension 27 and is adapted to be slidably received in the recess 31 formed between the stop member 32 and guide 33. Stop member 32 projects over into cooperative relation to the pin 30 and is secured to the inside of the housing 12. The lug 34 integral with drum 14, retains the element 27 in a certain relative position when the hand is in signaling position.

The controlling and locking means for the arm consists of a housing 35 which is mounted on the inside of the car at any convenient point and in which is rotatably mounted a sheave 36, the shaft 37 being rotatably mounted in the housing 35, and having affixed to its outer end, a lever 38 which is provided with a handle 39 and a push button lock release 40. A flexible element 41 cooperates between the sheave 14 and sheave 36, the spring 15 normally retaining the arm in closed or non-signaling position.

A guide 42, which is concentric with the drum 14, cooperates with the pin 30 and retains the hand in open position as the signaling arm is moved to various signaling positions.

The control housing is provided with a plurality of lugs 43, concentrically disposed about the lever shaft 37, the projections 43 being spaced apart to provide recesses 44 for cooperation with a tooth 45 which is integral with a sliding member 46 for locking the arm in various signaling positions.

The control lever consists of a lever portion 38 and handle 39, the locking portion 46 having a recess formed at 47 adapted to clear the projections 43, the upper portion 48 of member 46 having fixedly secured thereto a plunger 49 terminating in the push button 40, the push button 40 operating in a bore 50 which terminates in a seat 51, the spring 52 cooperating between the seat 51 and the undersurface of push button 40 for urging the push button outwardly, and the lug 45 into a space or recess 44. A slot 53 permits reciprocating motion of the member 46 on shaft 37.

A lighting element consisting of a lamp 54 is mounted in a housing 55 having a side slot 56 formed therein so as to illuminate the arm as also to shield the light from advancing or following vehicles and one of these lighting elements may be placed on each side of the housing 12 if so desired.

The switch for the lighting element consists of a disc of insulating material 57 which is fixedly mounted on the sheave 36 and which is provided with a recess 58 which is in registry with the spring finger 59 when the arm is in non-signaling position, the terminals of the recess 58 forming cam surfaces. A cooperating spring finger 6 is adapted for contact with the finger 59 when the finger 59 is urged outwardly by the cam surfaces and when the finger 59 rides on the outer surface 61 of the insulating disc 57. Terminals 62 and 63 are provided respectively for the fingers 60 and 59, the finger 60 being insulated from the mounting screw 64 which provides the terminal for the finger 59.

The operation of the device is as follows:

The arm in non-signaling position is shown in Fig. 2, the hand member 18 being folded over on to the hand member 17, and the folded hand members being folded back on the arm 10, lever 38 being in a vertical position and the electric switch being in the position shown in Fig. 8 or in open circuit.

In this position pin 30 is resting in the recess 31 and retains the hand by cooperation of the rack 26 with pinion 25, in the position indicated.

By depressing button 40, thus releasing lock member 45 from cooperation with the recess 44 and moving lever 38 to the position shown in Fig. 1, rack 26 is retained in its relative position while the arm swings outwardly and opens the hand by cooperation with the pinion, the distance between the location of the pin 30 and the pinion 25 increasing as the arm is swung outwardly, and on reaching the position shown in Fig. 1, the hand portion 18 has been drawn back into cooperation between the lug 19 and the stop 20 and the lug 21 cooperating with stop 23 on member 17 also brings the member 17 around to its relative position as related to the member 18.

By this time the pin 30 has ridden out of the recess 31 and is now retained in its position by the lug 34 on drum 14 and rides in the recess formed between the drum and the arcuate track 42 which retains the hand in open position when the lever 38 is moved to other signaling positions.

It will be noted that this arm may be arranged to be set and locked at any position from vertically downward to vertically upward and that when the arm is moved to the vertically downward position that the last or final movement folds the hand up against the arm within the housing 12 and folds the two portions of the hand one on the other so that the hand will only require the same space as the arm and a very compact non-signaling position structure is thereby provided.

As the arm is swung from non-signaling position, the cam surfaces formed by the recesses cooperate with the finger 59 and urge this finger into contact with the terminal of finger 60 completing the electric circuit to the lamp 54, lighting the lamp which remains lighted so long as the arm is in signaling position.

Having described an operative device it will be understood that variations in the construction and arrangement of parts which are consistent with the appended claims may be resorted to without detracting from the spirit or scope of the invention or sacrificing any of the advantages thereof.

I claim:

1. A direction signal comprising a signaling element consisting of an arm portion and two foldable hand portions pivotally connected together, means for automatically folding said hand portions together and then folding the folded hand within said arm portion when said arm portion is moved to non-signaling position.

2. In combination with a signaling arm and controlling means therefor; a two-part hand pivotally secured to said arm, means for automatically folding said hand on said arm when said arm is moved to non-signaling position, movement limiting means for said hand, and means limiting movement of one part of said hand relative to the other part.

3. In combination with a signaling arm and controlling and locking means therefor; a two-part hand pivotally secured to said arm, means for automatically folding the parts of said hand together and then folding the folded hand within said arm as the latter is moved to non-signaling position, movement limiting means for said hand, means limiting movement of one part of said hand relative to the other part, and a housing adapted to receive and conceal said signaling arm when folded.

4. A collapsible signaling element consisting of an arm portion and a two-part hand portion pivotally connected together, movement limiting means for one part of said hand portion relative to the other part, movement limiting means for both parts of said hand portion relative to said arm portion and means for automatically moving said hand portion to folded and open position respectively when said element is moved respectively to non-signaling and signaling position.

In testimony whereof I affix my signature.

PAUL A. HERNANDEZ.